No. 753,780. PATENTED MAR. 1, 1904.
W. WOODS.
WATER FILTER AND PURIFIER.
APPLICATION FILED SEPT. 30, 1903.
NO MODEL.

Witnesses:
Dow W. Vorhies
Stella Snider

Inventor:
William Woods,
By E. T. Silvius,
Attorney.

No. 753,780. Patented March 1, 1904.

UNITED STATES PATENT OFFICE.

WILLIAM WOODS, OF SPENCER, INDIANA.

WATER FILTER AND PURIFIER.

SPECIFICATION forming part of Letters Patent No. 753,780, dated March 1, 1904.

Application filed September 30, 1903. Serial No. 175,112. (No model.)

*To all whom it may concern:*

Be it known that I, WILLIAM WOODS, a citizen of the United States, residing at Spencer, in the county of Owen and State of Indiana, have invented new and useful Improvements in Water Filters and Purifiers; and I do declare the following to be a full, clear, and exact description of the invention, reference being had to the accompanying drawings, and to the letters of reference marked thereon, which form a part of this specification.

This invention relates to filters and purifiers that are adapted to be submerged or placed in the water in cisterns, wells, or tanks to operate therein, and the invention has reference particularly to the construction and arrangement of the devices for filtering and purifying the water and for obtaining the treated water from the filtering vessel.

The object of the invention is to provide efficient, convenient, and inexpensive means whereby potable water may be obtained in small quantities, as wanted, from the bottoms of wells, cisterns, or tanks, where the water naturally may be cooler than elsewhere in such reservoirs.

The invention consists in a vessel having a water-chamber and provided with filtering and purifying substances beneath the chamber, the vessel being adapted to be submerged in water while in operation; and the invention consists, further, in the novel parts and the novel combination and arrangement of parts as hereinafter particularly described, and pointed out in the appended claims.

Figure 1:
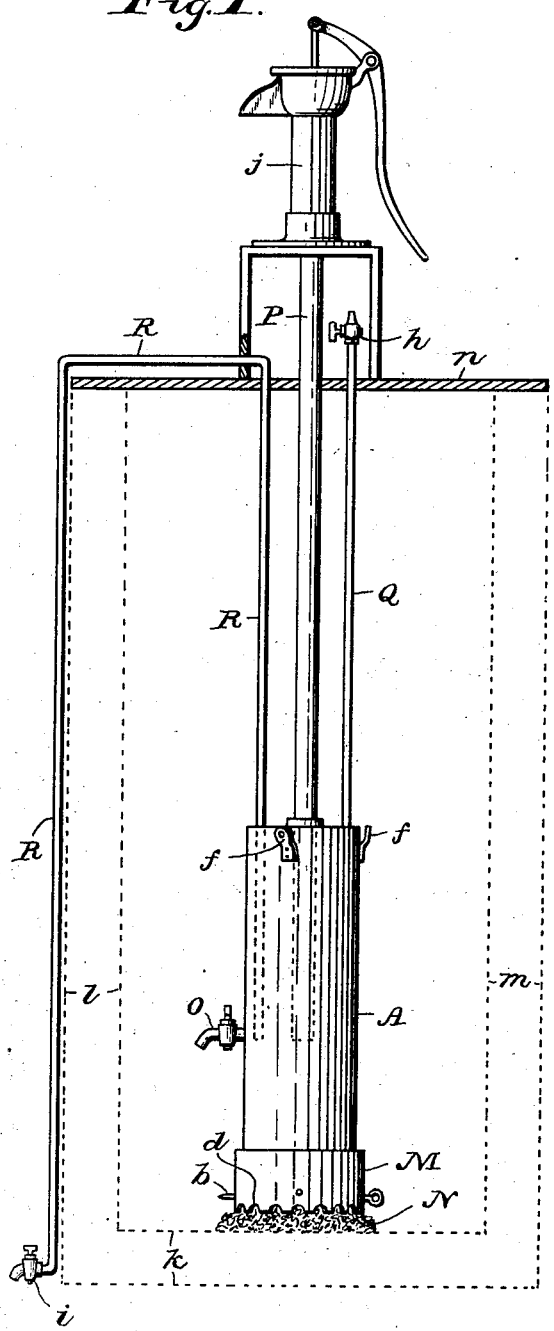
Figure 2:
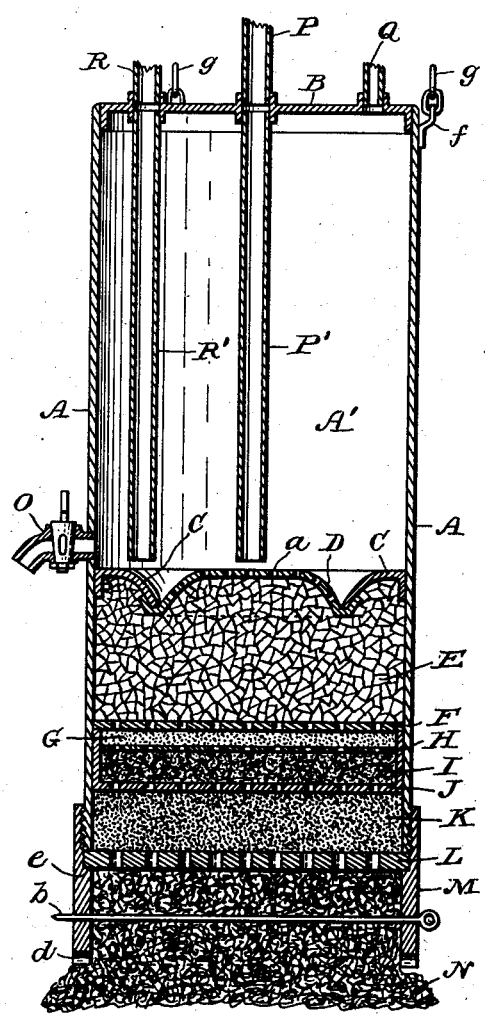
Figure 3:
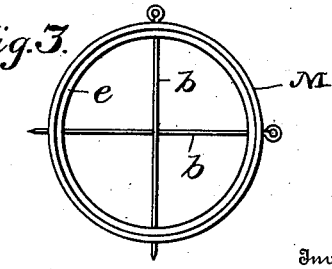

Referring to the drawings, in which similar reference characters designate like parts, Figure 1 represents an elevation of the apparatus as arranged for use in connection with a pump and a siphon. Fig. 2 is a central vertical sectional view of the filter and purifier, showing the internal construction thereof; and Fig. 3 is a top plan of the base-ring of the filter and purifier.

In construction a barrel A is employed which has a close top B, and the water-chamber A' is in the upper portion of the barrel, the chamber having a perforate bottom through which the water may enter the chamber. The bottom comprises an annular imperforate dished plate C, attached closely to the barrel, and a dished central plate D, having perforations $a$ and attached either permanently or detachably to the plate C. The plate C is so dished that its inner edge is depressed below the plane at which the plate is connected to the barrel, so that water cannot follow a course up along the barrel-wall and close to the plate C and pass through the chamber-bottom without having thorough contact with the purifying substance, the water being compelled by natural laws to flow through the purifying substance that will be in the relatively higher portion of the plate C adjacent to the barrel-wall in order to pass under the depressed portion of the plate where it is attached to the plate D. Under the bottom of the chamber is a mass of suitable purifier E, composed, preferably, of animal charcoal, under which is a removable perforate plate F, and under this is a mass of filtering-sand G. Under the sand G is a removable perforate plate H, under which is a mass of purifier I, composed, preferably, of flour of sulfur held in small fine sponges, and under this is a removable perforate plate J, which may have a flange, as a tray. Under the plate J is a mass of filtering-sand K, extending to the lower end of the barrel. A heavy removable perforate plate L bears against the lower end of the barrel under the sand K and is held in place by a heavy base-ring M, removably attached to the barrel by screw-threads, the ring having a shoulder $e$ bearing against the plate L. Under the plate L is a sponge or sponges N, filling the ring M and protruding below the bottom thereof, the bottom of the ring preferably having notches $d$ therein. The sponge is held in place by pins $b$, extending therethrough and through suitable holes in the ring. The barrel may be inverted when placing the various substances and plates therein.

In some cases the barrel A is provided with ears $f$ and chains $g$ of suitable length, whereby the device may be drawn from the reservoir, as it may be used without a pump or a siphon connection and may be elevated in order to draw water therefrom, a faucet O being provided for the purpose at the lower portion of the water-chamber.

A vent-tube Q is connected to the top B and has a stop-cock $h$ at its top; yet the cock may usually be omitted, although useful in preventing the entrance of insects into the filtered water.

A pump-pipe P is attached to the top B, and a pump $j$ is connected to the pipe, an extension-tube P' being also attached to the top B and extending nearly to the bottom of the chamber A', the tube thus being a continuation of the pipe P. When the pump is not employed, the pipe P may be detached, and the top of the tube P' must then be plugged. When desired, of course the pump, and also the tube P', may be dispensed with.

A siphon R is connected to the top B and has a continuing extension R', extending as a separate tube from the top B nearly to the bottom of the chamber A', the end of the siphon being provided with a stop-cock $i$. If the siphon be disconnected, the extension R' must be plugged.

In Fig. 1, $k$ designates the bottom, and $l$ and $m$ the sides, (shown in broken lines,) of a well, a cistern, or a tank, illustrating the relative positions when in use of the parts of the apparatus comprised in the invention, $n$ being the cover of the reservoir.

It will be understood that when it is designed to lower and elevate the filter by means of the chain the pump and the siphon will not be employed, and if either the pump or the siphon be employed the other attachments will not be required, the pump being adapted for wells and cisterns in the ground, while the siphon is adapted for tanks of rain-water above ground. For cisterns and wells the smaller sizes of filters may be readily drawn up by hand to obtain water from the faucet O, this faucet of course being unnecessary when a pump or a siphon is employed.

In practical use the filter and purifier may be set on the bottom or slightly above the bottom of the reservoir from which it is desired to obtain water. The sponge N at first will contain air, and consequently oxygen, which may somewhat improve the quality of the water. The stop-cock $h$ being opened will afford a vent, so that the water may rise through the filtering and purifying substances into the water-chamber A' through the bottom thereof, the cock O being closed and the filtered and purified water being retained in the water-chamber ready for use, while the impure water is excluded therefrom. At times the cock $h$ may be closed. Before replacing the vessel after having been elevated to the ground-surface the water may be pressed from the sponge N, so that oxygen may enter the sponge. When a pump or a siphon is provided, they may be operated in the usual manner, as will be understood. The peculiar shape of the dished plate C insures thorough contact of the water with the body of the purifying substance E before passing through the perforations $a$ in the bottom of the water-chamber. When found desirable, the filtering and purifying substances may readily be removed and fresh substances substituted therefor, as will be apparent.

Having thus described the invention, what I claim as new is—

1. A water filter and purifier including a barrel having a water-chamber provided with a filtering bottom and also a long vent-tube extending from the top of the chamber, lifting-links attached to the top of the barrel, and a stop-cock connected to the barrel at the bottom of the water-chamber thereof.

2. A water filter and purifier including a barrel having a water-chamber in the uppermost portion thereof provided with a filtering bottom and also a long vent-tube extending from the top of the chamber, a discharge-pipe attached to the top of the chamber and extending vertically nearly to the filtering bottom thereof, an annular base or ring detachably secured to the lower end of the barrel, a perforate plate supported by the annular base or ring, filtering and purifying substances arranged between the perforate plate and the filtering bottom of the chamber, and sponge substance in the annular base beneath the perforate plate.

3. In a water filter and purifier, the combination of an upright barrel having a closed top, an annular base or ring detachably secured to the lower end of the barrel, a sponge in the annular base and extending beyond the lower edge thereof, a removable sponge-holder connected to the annular base and engaging the sponge, a perforate plate in the lower end portion of the barrel upon the top of the sponge, a perforate water-chamber bottom attached to the barrel above the perforate plate, filtering and purifying substances arranged between the perforate plate and the chamber-bottom, and a long vent-tube attached to the closed top of the barrel.

4. In a water filter and purifier, the combination of a barrel provided in its middle portion with a perforate chamber-bottom and at its upper end having a closed top, the whole upper portion of the barrel between said bottom and said top being a water-chamber, an annular base detachably connected to the lower end of the barrel and having notches in the lower edge thereof, a sponge in the annular base, a removable sponge-holder connected to the annular base and engaging the sponge, a perforate plate in the lower end of the barrel upon the sponge, and filtering and purifying substances arranged between said perforate plate and said perforate chamber-bottom.

5. In a water filter and purifier, the combination of a barrel the major upper portion of which forms a water-tight chamber having a perforate bottom attached to the middle portion of the barrel, and the lower portion of the barrel having filtering and purifying substances therein weighting and plumbing the barrel, a vent-tube attached to the top of the barrel, a lifting-chain attached to the upper portion of the barrel, and a faucet attached to the barrel adjacent to the perforate bottom.

6. In a water filter and purifier, the combination of a barrel having a closed top, a perforate chamber-bottom in the barrel, filtering and purifying substances arranged below the bottom in the barrel, an annular base removably connected to the lower end of the barrel, a sponge in the annular base, a removable sponge-holder connected to the base and extending through the sponge, a perforate plate upon the sponge and supporting the said substances, a suction-pipe extending from the top of the barrel nearly to the perforate chamber-bottom, and a tube attached to and extending upwardly from the barrel-top for admitting air to the water-chamber and also for excluding surrounding water from the chamber.

7. In a water filter and purifier, the combination of a barrel having a water-chamber provided with a perforate bottom and water-tight sides and top, the bottom comprising an annular imperforate dished plate attached to the barrel and a perforate central plate connected to the annular plate, and a vent-tube connected with the water-chamber, with filtering and purifying substances supported in the barrel under the perforate bottom.

8. In a water filter and purifier, the combination of a barrel having a water-chamber provided with a perforate bottom and water-tight sides and top, the bottom comprising an annular imperforate dished plate attached to the barrel and a dished perforate central plate connected to the annular plate, a vent-tube connected with the water-chamber, filtering and purifying substances in the barrel under the perforate bottom, and a tube attached to the top of the chamber and extending nearly to the bottom thereof, with a suction-pipe communicating with the tube.

In testimony whereof I affix my signature in presence of two witnesses.

WILLIAM WOODS.

Witnesses:
　DAVID E. BEEM,
　LEVI A. BEEM.